(12) United States Patent  (10) Patent No.:     US 6,744,356 B2
Hamilton et al.                (45) Date of Patent:         Jun. 1, 2004

(54) TIRE PRESSURE MAINTENANCE AND MONITORING SYSTEM (75) Inventors: Brian K. Hamilton, Ogden, UT (US); Brent Parks, Englewood, CO (US)

(73) Assignee: Autoliv ASP, Inc., Ogden, UT (US)

( * ) Notice: Subject to any disclaimer, the term of this patent is extended or adjusted under 35 U.S.C. 154(b) by 151 days.

(21) Appl. No.: 10/193,511

(22) Filed: Jul. 11, 2002

(65) Prior Publication Data

US 2004/0007302 A1 Jan. 15, 2004

(51) Int. Cl.[7] ............................................... B60C 23/00
(52) U.S. Cl. ...................... 340/444; 152/418; 73/146.5; 340/447; 340/448; 417/233
(58) Field of Search ................................ 340/442, 443, 340/444, 445, 446, 447, 448; 73/146.4, 146.5; 417/233, 470, 328; 152/418; 280/304.2

(56) References Cited

U.S. PATENT DOCUMENTS

| 4,349,064 A | | 9/1982 | Booth ......................... 152/418 |
| 4,432,405 A | | 2/1984 | Grushkin ..................... 152/424 |
| 4,570,691 A | | 2/1986 | Martus ...................... 152/332.1 |
| 4,651,792 A | | 3/1987 | Taylor ......................... 152/415 |
| 4,700,579 A | * | 10/1987 | Hall .......................... 73/861.78 |
| 4,936,508 A | * | 6/1990 | Ingalz ........................... 239/72 |
| 5,201,968 A | | 4/1993 | Renier ......................... 152/418 |
| 5,342,177 A | | 8/1994 | Cheng ......................... 417/233 |
| 5,355,924 A | | 10/1994 | Olney ......................... 152/418 |
| 5,472,032 A | | 12/1995 | Winston et al. ............. 152/415 |
| 5,505,080 A | * | 4/1996 | McGhee ..................... 73/146.5 |
| 5,556,489 A | | 9/1996 | Curlett et al. ............... 152/418 |
| 5,558,730 A | | 9/1996 | Olney et al. ................. 152/418 |
| 5,707,215 A | | 1/1998 | Olney et al. ................. 417/233 |
| 5,934,882 A | | 8/1999 | Olney et al. ................. 417/233 |
| 5,941,692 A | | 8/1999 | Olney et al. ................. 417/233 |
| 5,947,696 A | | 9/1999 | Baumgarten ................ 417/233 |
| 6,589,014 B1 | * | 7/2003 | Hawryluk et al. .......... 415/202 |

* cited by examiner

Primary Examiner—Brent A. Swarthout
(74) Attorney, Agent, or Firm—Sally J. Brown (57) ABSTRACT

A generator system powered by a fluid fly-wheel is disclosed that generates electric current to power a tire pressure maintenance and monitoring system. A vehicle wheel including a tire and a rim. A sealed tube containing fluid is fixed around the rim. When the rim accelerates or decelerates, the fluid within the tube moves within the tube a turbine in communication with the fluid is turned by the moving fluid within the tube. The turning turbine drives an electric generator to produce an electric current through induction. In certain configurations, the turning turbine rotates gears to drive a mechanical pump. The electric generator, or mechanical pump may be used to add air pressure to the tire when a sensor indicates low air pressure.

40 Claims, 6 Drawing Sheets

TIRE PRESSURE MAINTENANCE AND MONITORING SYSTEM

BACKGROUND OF THE INVENTION

1. The Field of the Invention

The present invention relates to a vehicle air pressure maintenance systems. More specifically, the invention relates to a self-contained tire pressure maintenance and monitoring system powered by a fluid fly-wheel generator.

2. Technical Background

Monitoring and maintaining proper tire air pressure for vehicles has long been an important maintenance item carried out by a vehicle owner. Early on, tire pressure was checked regularly because low pressure tires were easily noticed. However, as tire technology has advanced low pressure tires are harder to spot by simple observation. This, and a perception that more advanced tires experience fewer slow leaks, has lead vehicle owners to stop or drastically reduce monitoring of tire pressure for their vehicles.

Tires are still subject to leaks. Generally, the leaks are slow and may not always completely deflate the tire. The leaks may be caused by failed tire valves, an opening between the tire and rim, or a puncture of the tire or inner tube by a foreign object such as glass or a nail. Natural leaks may reduce the pressure by as much as 1 pound per square inch (psi) per month. Seasonal temperature changes also reduce tire pressure by 1 psi for every drop of 10 F. degrees in temperature. Changes in altitude also affect tire pressure.

Low tire pressure may cause significant problems. Studies relied upon by the National Highway Traffic Safety Administration (NHTSA) indicate that low pressure tires reduce vehicle safety. For example, lower pressure causes more wear on the tire sidewalls which may lead to premature failure. The NHTSA estimates that 23,464 crashes were a result of under inflated tires.

Low tire pressure also reduces the life of the tire. Data from Goodyear and Michelin indicate that tires which are 20% under inflated can reduce the tires life by up to 50%. Low tire pressure causes the tire tread to wear non-uniformly which may also cause premature failure of the tire. Tire costs, particularly for the trucking industry, are the second highest maintenance expense behind fuel. Tire costs even exceed the cost for drivers of the trucks.

Low tire pressure reduces the fuel economy for the vehicle. Tires with lower pressure require more energy to turn. Goodyear indicates that tires that are 15% under inflated result in 2.5% increased fuel consumption.

In response to these problems caused by low tire pressure, efforts have been made to provide devices and systems which monitor and/or maintain the tire pressure in a vehicle's wheels. The pressure maintenance efforts have focused on mechanisms for adding small amounts of air to the tire while the tire rotates to compensate for losses due to leaks.

These devices are often attached to the tire and/or the axle of a wheel. However, some systems interfere with the normal operation of the tire. Devices attached to the axle generally must be removed before the rim or brakes of a particular wheel may be accessed.

Other devices leverage the centripetal force generated by the turning wheel to drive mechanical pumps. The devices are generally attached to the axle or the rim of the wheel. However, these devices are often expensive and may require constant maintenance to ensure proper operation. Furthermore, these devices often fail to monitor the tire pressure to notify a vehicle driver of low pressure tires.

Conventional devices generally do not compensate for changes in altitude or ambient air temperature. Devices which do allow for altitude or temperature compensation, may often require manual adjustment to compensate. Furthermore, the complexity and relatively high number of moving parts lead to higher maintenance and repair costs for the devices.

Other conventional devices for maintaining air pressure are not "fail-safe" meaning failure of the devices can directly cause the tire to fail. For example, the device may continue adding air when the proper pressure is reached, thereby causing a blow-out. Alternatively, the components of the device may fail and cause more air to leak than normally would without the device.

Finally, a federal government agency is proposing to require tire pressure monitoring systems on all new cars, trucks, and multipurpose passenger vehicles. (See "Tire pressure monitoring systems; controls and displays" NHTSA, 49 CFR Part 571) This proposal would require tire pressure systems to notify the driver of low pressure tires below a threshold level. Such a proposal may be very costly if conventional tire pressure maintenance and monitoring systems must be used and maintained (replacement of batteries, etc.).

Accordingly, it would be an advancement in the art to provide a tire pressure maintenance and monitoring system which is powered by a simple fluid fly-wheel generator. It would be a further advancement to provide a tire pressure maintenance and monitoring system which is reliable, and inexpensive to produce. Additionally, it would be an advancement in the art to provide a tire pressure maintenance and monitoring system which does not interfere with the axle or tire and does not cause the tire to fail if the system fails. The present invention provides such a system in a novel and useful way.

BRIEF SUMMARY OF THE INVENTION

The apparatus of the present invention has been developed in response to the present state of the art, and in particular, in response to the problems and needs in the art that have not yet been fully solved by currently available tire pressure maintenance and monitoring devices. Thus, the present invention provides a tire pressure maintenance and monitoring system which is simple, inexpensive, self-contained, and fails safely.

In one embodiment, the tire pressure maintenance and monitoring system includes a simple fluid fly-wheel generator. The fluid fly-wheel generator includes a sealed tube. Preferably, the tube is a toroid shape which rotates about a central axis. In certain configurations, the tube may be fixed to a rim of a vehicle wheel.

A fluid, preferably hydraulic fluid, within the tube is free to circulate through the tube. The fluid flows within the tube when the tube accelerates about the axis. As the tube accelerates rotationally, the inertia of the fluid causes the fluid to flow in the opposite direction of the tube's rotational acceleration.

A turbine within the tube is turned by the flow of the fluid. In one configuration, the turbine transfers the inertia of the fluid into mechanical energy to drive a mechanical pump or electric generator. Alternatively, the turbine may include magnetic poles and be configured to rotate about a lateral axis to induce a current in wire coils. The tube, fluid, and turbine cooperate to form a "liquid fly-wheel."

In one embodiment, the turbine of the liquid fly-wheel may be magnetized to generate a magnetic field. External to the tube and in close proximity to the turbine a pair of opposing wire coils may be saddled around the tube within the magnetic field. The rotating turbine generates an electric current in the windings through induction.

In another embodiment, the liquid fly-wheel powers a mechanical pneumatic pump. The turbine may be coupled to a spur gear which turns a crank to drive a pneumatic piston when the turbine turns. In addition, the piston may be biased by a temperature sensitive spring to control the piston movement based on the ambient temperature. The pneumatic pump may also include check valves to control when pumped air may enter the tire. These check valves may discharge the pumped air when the tire pressure reaches a pre-determined level.

In certain embodiments, the turbine of the liquid fly-wheel may be coupled to various electrical and/or mechanical components to provide a tire pressure maintenance and monitoring system. In one configuration, the liquid fly-wheel is coupled by a shaft to an electric generator. The turbine of the liquid fly-wheel turns the shaft to power the electric generator which produces a current.

In one embodiment, the tire pressure maintenance and monitoring system may be wholly contained within a vehicle wheel. The liquid fly-wheel and electric generator may be fixed to the outer edge of a rim within the tire walls. The electric current may be stored within a battery or capacitor fixed to the rim or used directly to power an electric pneumatic pump also attached to the rim. The electric pump may draw current from the battery, capacitor, and/or the electric generator. The pump may be controlled by a pressure sensor which activates the pump when the air pressure drops below a pre-determined level. Alternatively, the pump may be controlled by a logic system which actuates the pump based on other factors. For example, the logic system may actuate the pump based on a pre-determined wheel speed.

The tire pressure maintenance system may also include a controller coupled to the pump, a temperature sensor and an altitude sensor in communication with the controller. The controller may periodically monitor readings from the temperature sensor, altitude sensor, and pressure sensor. Based on the readings, the controller may automatically control the electric pump to regulate the air pressure within the tire. Furthermore, the controller may transmit the readings by radio signals from a first transceiver to a second transceiver external to the vehicle wheel. Of course signals representing the readings may be sent through induction or optical couplings as well. The second transceiver may communicate the signals to a vehicle control system (VCS). Based on the signals, the VCS may provide a notification to a driver of the condition of the air pressure within one or more vehicle tires. In one configuration, a display light is illuminated to indicate a tire with low air pressure.

The tire pressure maintenance system may also include an electric charge sensor for monitoring an amount of charge in the battery. The electric charge sensor being coupled to the battery and the controller. The controller may use readings from the electric charge sensor to maintain a level of charge in the battery to a minimum level. The minimum level may be at least enough charge to allow the system to transmit current tire pressure readings to the second transceiver. Thus, the battery is continuously being re-charged. In this manner, a driver is at least notified of the current tire pressure readings and can take appropriate action.

BRIEF DESCRIPTION OF THE DRAWINGS

In order that the manner in which the above-recited and other advantages of the invention are obtained and may be readily understood, a more particular description of the invention briefly described above will be rendered by reference to specific embodiments thereof which are illustrated in the appended drawings. Understanding that these drawings depict only typical embodiments of the invention, and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention can be better understood with reference to the drawings where like parts are designated with like numerals throughout.

Figure 1:
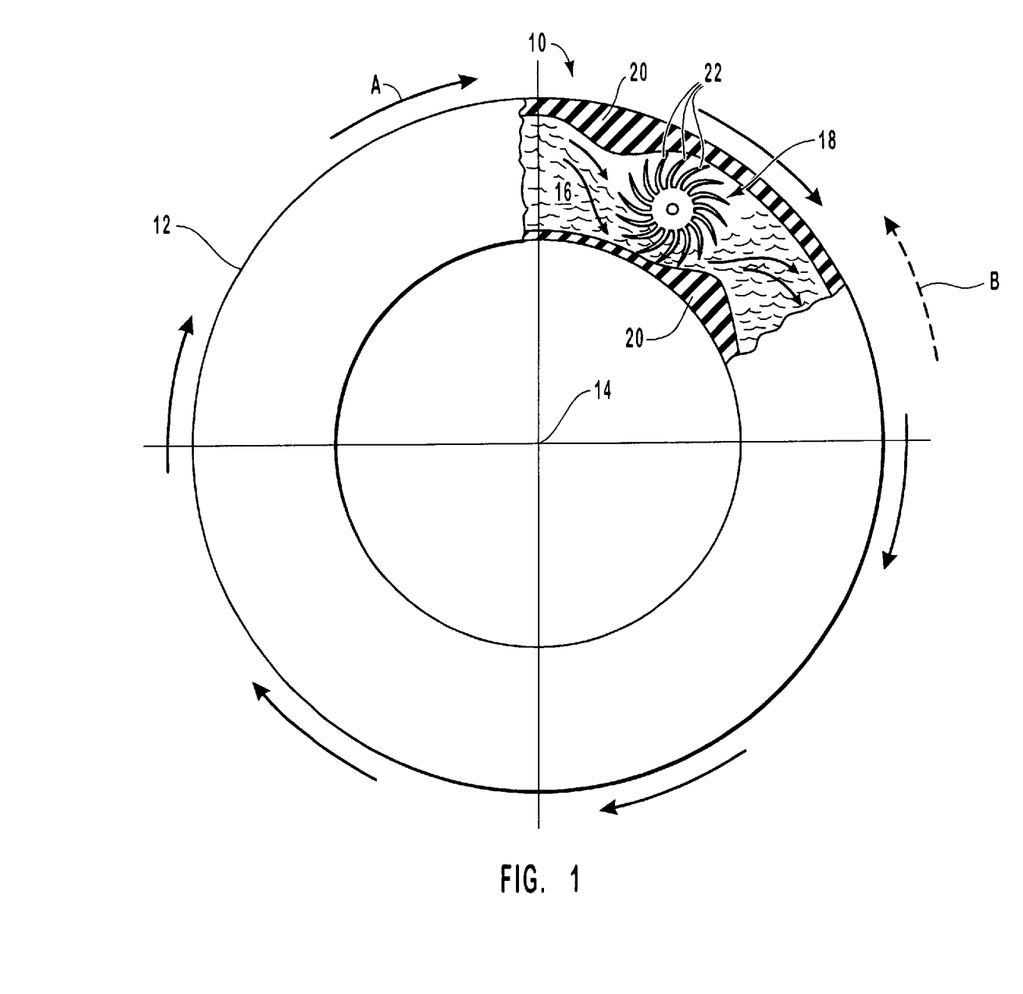
FIG. 1 is a perspective cut-way side view illustrating one embodiment of a fluid fly-wheel for converting the inertia of fluid within a tube into useful electrical or mechanical energy.

FIG. 1 is a perspective cut-way side view illustrating one embodiment of a fluid fly-wheel 10. The fluid fly-wheel 10 stores energy by capitalizing on inertia of objects at rest and in motion. In the present invention, this stored energy may be put to use in productive ways such as to power an air pressure maintenance and monitoring system.

The fluid fly-wheel 10 includes a tube 12. Preferably, the tube 12 is sealed to allow a fluid 14 within the tube 12 to circulate around the inside of the tube 12. In one embodiment, the tube 12 has a circular cross-section and forms a toroid shape. Alternatively, the tube's cross-section may be oval or another shape.

Generally, the tube 12 is rigid. Accordingly, the tube is made from materials such as metal, hard plastic, or the like. The size and shape of the tube 12 depends largely on where the fluid fly-wheel 10 is implemented. Preferably, the tube 12 is integrated into a circular member such as a wheel, or rim. Alternatively, the tube 12 may be a separate member attached to members such as wheels, axles, and the like.

The tube 12 is rotated by an external motive force about a central axis 14. The motive force is provided by the member to which the tube 12 is attached. In one embodiment, the tube 12 rotates in both a clock-wise and counter-clock-wise direction about the central axis 14. Alternatively, the tube 12 may only rotate in one direction about the central axis 14. Generally, the central axis 14 of the tube 12 is also the axis of rotation for a member to which the tube 12 is attached. For example, an axle of a wheel to which the tube is attached may correspond to the central axis 14.

In one embodiment, the tube 12 is filled with a fluid 16. Preferably, the fluid 16 is a hydraulic fluid although other fluids 16 may be also used. Generally, the fluid 16 has a low viscosity similar to water.

The fluid fly-wheel 10 operates based on the simple principle of inertia. Preferably, an external motive force rotates the tube 12 about the central axis 14. Preferably, the rotational velocity of tube 12 changes often. This acceleration, both positive and negative, cause the fluid 16 to flow within the tube 12 in the opposite direction as the acceleration. For example, if initially the fluid 16 and tube 12 are at rest and the tube 12 begins to accelerate about the axis 14, the inertia of the fluid 16 causes the fluid 16 to tend to remain at rest. Consequently, the fluid 16 "flows" within the tube 12 because the tube 12 is moving with respect to the fluid 16. The fluid 16 then continues to "flow" until friction of the fluid 16 with the interior of the tube 12 causes the fluid 16 to accelerate about the axis 14 as well. Similarly, if the fluid 16 and tube 12 are at a constant velocity, the fluid 16 is not flowing within the tube 12. However, once the rotating tube 12 decelerates, the inertia of the rotating fluid 16 causes the fluid 16 to continue moving within the tube 12.

The fluid fly-wheel 10 may be used in a variety of environments which provide external motive rotational forces and acceleration. In particular, a fluid fly-wheel 10 may be integrated with vehicle wheels in cars, trucks, or the like. While the wheels rotate principally to move the vehicle, the wheels also store rotational energy which is generally lost to heat during braking. The wheels may accelerate and decelerate often during normal use of the vehicle, particularly during city driving. A fluid fly-wheel 10 integrated with the wheel may require only a minimal additional rotational force to rotate the wheel. Acceleration of the wheel allows the fluid fly-wheel 10 to convert rotational energy, which otherwise may be lost, into other forms of energy.

The energy stored within the fluid 16 as the tube 12 accelerates may be captured and converted into other energy forms by a turbine 18 in communication with the fluid 16. The flowing fluid 16 turns the turbine 18 to generate mechanical energy. In one embodiment, the turbine 18 may be configured to generate electrical energy.

In the depicted embodiment, the turbine 18 is integrated with the tube 12. Alternatively, the turbine 18 may be installed within the tube 12. In one embodiment, the tube 12 may include guides 20 that direct the fluid 16 with respect to the turbine 18 such that the turbine 18 rotates in one direction. Alternatively, the tube 12 may be configured to allows the turbine 18 to rotate in both directions.

Referring still to FIG. 1, the fluid fly-wheel 10 provides a simple, efficient capture of energy. Suppose the tube 12 rotates about the axis 14 in direction A at a constant velocity. After a period of time, the fluid 16 would also rotate at about the same constant velocity. If the tube 12 is decelerated, accelerated in the direction opposite the direction of rotation, in direction B, the fluid 16 continues to flow within the tube 12 in direction A. The fluid 16 impacts the props 22 of the turbine 18 and rotates the turbine 18.

The fluid 16 may hold a high degree of potential energy. In one embodiment, with the diameter within the tube 12 of about 0.5 inches and the diameter of a circle enclosed by the tube 12 of about 17 inches and the tube 12 rotating at about 60 miles per hour, if the tube 12 is stopped, the fluid 16 may transfer as much as 20 ft.-lbs. of energy.

Figure 2:
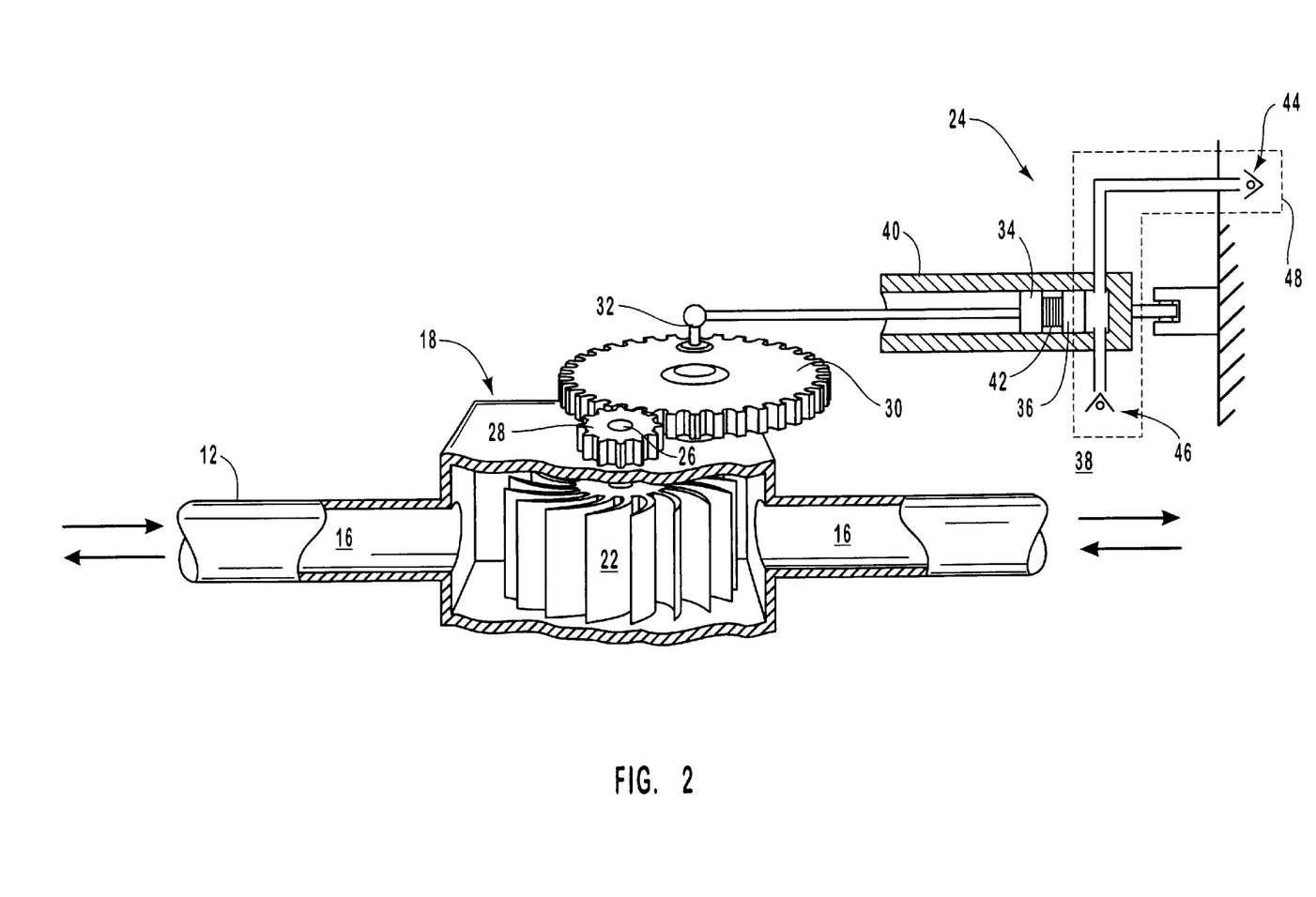
FIG. 2 is an enlarged perspective cross-section view illustrating one embodiment of the turbine integrated with the tube.

Referring now to FIG. 2, a cross-section of a turbine 18 integrated with the tube 12 is illustrated. Also illustrated, is a pneumatic pump 24 mechanically operated by the turbine 18. Generally, the turbine 18 includes two or more props 22 connected to a turbine shaft 26. Fluid 16 flowing through the turbine 18 turns the props 22 which rotate the turbine shaft 26. The rotating turbine shaft 26 may be used to drive other electrical or mechanical components.

In the depicted embodiment, the turbine shaft 26 communicates the mechanical energy of the turbine 18 to a pneumatic pump 24. In one configuration, the turbine shaft 26 is connected to a spur gear 28 which meshes with a drive gear 30 such that the rotating turbine shaft 26 turns the drive gear 30. A crank 32 connects the drive gear 30 to a piston 34. The piston 34 compresses air within a cylinder 36 to increase the air pressure within a pressurized chamber 38 in fluid communication with the pump 24.

Preferably, the crank 32 is offset from the center of the drive gear 30. In addition, the piston 34 pivots with respect to the crank 32 such that the drive gear 30 may rotate in either direction and the piston 34 will still complete strokes within the cylinder 36. Furthermore, the housing 40 in which the cylinder 36 is formed is preferably anchored with respect to the piston 34.

In a preferred embodiment, the piston 34 is biased in its movement within the cylinder 36 by one or more temperature sensitive springs 42. The temperature sensitive springs 42 react to the ambient temperature to resist or allow compression of the piston 34 depending on the temperature. The springs 42 serve to dampen or increase the pressure the piston 34 is capable of providing to control the maximum pressure which may be output by the pump 24 into the pressurized chamber 38.

The pneumatic pump 24 may also include an intake check valve 44 and an output check valve 46. The valves 44, 46 may be characterized as a mechanical air pressure sensor 48. The valves 44, 46 may be configured such that they only allow pressurized air to be added to the pressurized chamber 38 when the pressure within the chamber 38 is below a pre-determined level. Similarly, the valves 44, 46 may be configured to allow pumped air to exit the pump 24 and avoid the chamber 38 when the pressure within the chamber 38 is at or above the pre-determined level.

For example, if the pressure within the chamber 38 is 25 psi, the pre-determined level is 30 psi, and the turbine 18 is driving the pump 24, the output valve 46 may be opened by the compressed air from the cylinder 36 while the intake valve 44 is closed. On the next cycle of the pump 24, the output valve 46 may be closed and the intake valve 44 opened so a new supply of air may enter the cylinder 36. The pump 24 continues in this manner until the pressure within the chamber 38 reaches 30 psi. Then, the intake valve 44 opens to release air within the cylinder 36 so the chamber 38 is not over inflated. Thus, the pump 24 maintains a constant pre-determined level of pressure.

Conventional tire valves are check valves designed to open only in response to high pressure or a manual force applied to a valve stem. In a preferred embodiment, the intake check valve 44 appears and functions as a conventional tire valve. Preferably, the pump 24 is inside the tire and has no other access to outside air other than the tire valve. Therefore, the pump 24 may use negative pressure, or suction, to open the tire valve and bring in more air. However, a pump 24 inside the tire in fluid communication with a conventional tire valve may be unable to produce the negative pressure necessary to open the tire valve to access an ambient air supply. To resolve the problem the pump 24 may be coupled to two or more valves as shown in FIG. 3.

Figure 3:
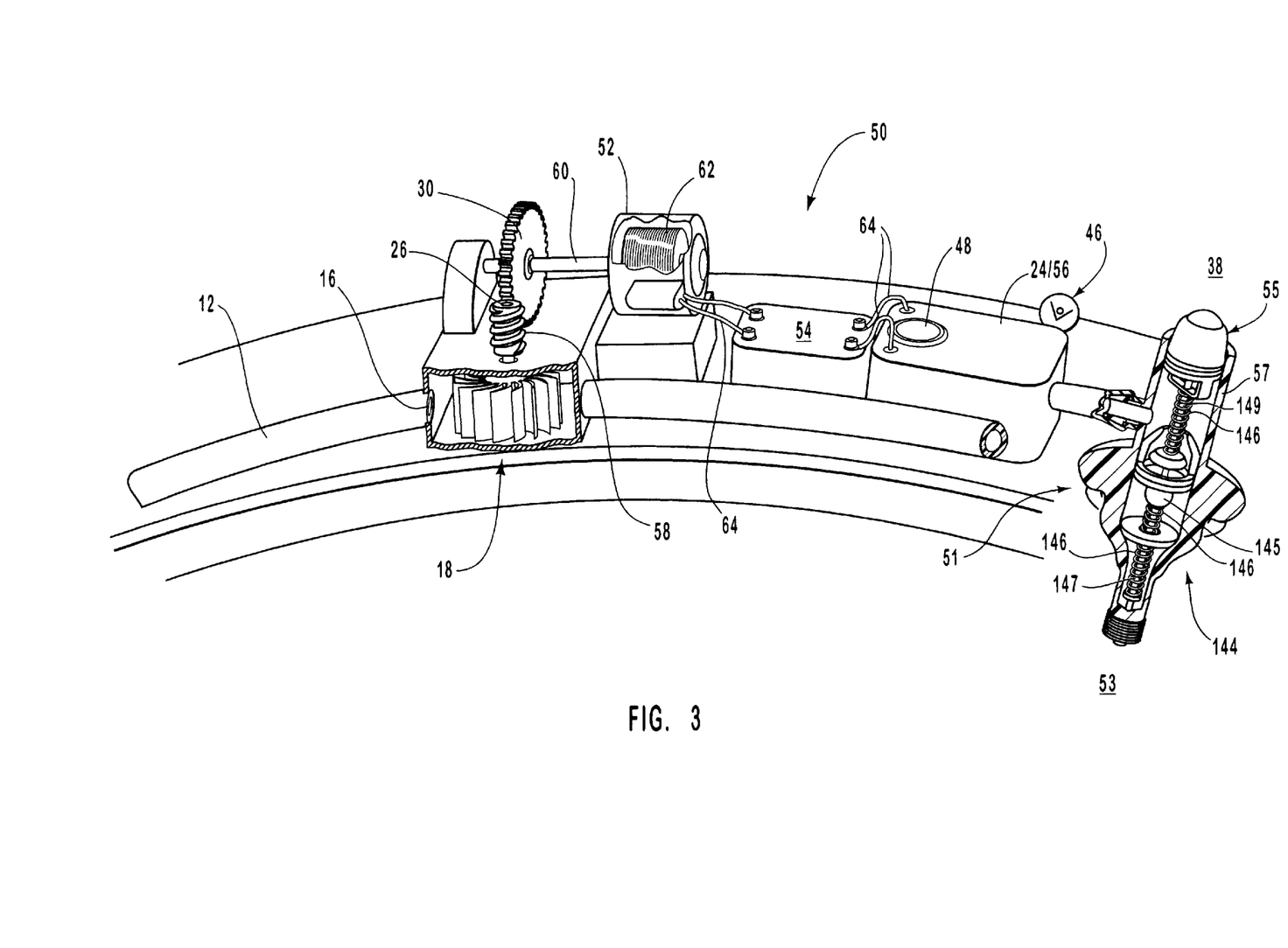
FIG. 3 is a perspective cut-away side view illustrating a tire pressure maintenance and monitoring system utilizing the fluid fly-wheel to power an electric pump to maintain the tire pressure within a vehicle wheel.

In FIG. 3, a fluid fly-wheel 10 coupled to a tire pressure maintenance system 50 which is electromechanical rather than simple mechanical is illustrated. The system 50 includes an electric generator 52, an electricity storage device 54, and an electric pump 56. While one embodiment is depicted, it is readily understood that many variations exist which are considered within the scope of the present invention.

A conventional tire valve interface 51 is provided which minimizes the negative pressure required for the pump 56 to access an ambient air supply 53. The interface 51 includes a conventional tire check valve 55 in fluid communication via tubing 57 with the pump 56 and an intake valve 144.

Preferably, the intake valve 144 extends away from and perpendicular to the central axis 14 of a wheel. The intake valve 144 is adapted to open when the valve 144 rotates about the axis 14 with at least a predetermined velocity. In one embodiment, the valve 144 includes a mass 145 connected to the valve 144. As the valve 144 rotates, a centrifugal force moves the mass 145 away from the axis 14 and opens the valve 144. When the tire slows its rotation, a spring 146 moves the mass 145 back towards the central axis 14 which closes the valve 144. In this manner, the pump 56 may be provided with access to the ambient air supply 53. The tire stays pressurized because the tire valve 55 remains closed.

The pump 56 may provide pressurized air through an output valve 46 in direct communication with a pressurized chamber 38 (the inside of the tire). Preferably, the output valve 46 is integrated with the pump 56. In the depicted embodiment, the pump 56 may include a pressure sensor 48 which shuts the pump 56 off to avoid over pressurization.

The intake valve 144 includes a valve stem 147. The valve stem 147 allows the tire valve interface 51 to be opened manually. By pressing the valve stem 147 with a tire gauge, inflation hose, or the like, the tire valve interface 51 is opened to allow inflation or deflation of the tire as desired.

The tire valve 55 may be manually opened by a linkage 149 between the tire valve 55 and intake valve 144. Preferably, the linkage 149 is a conventional valve stem which extends from the tire valve 55. The linkage 149 abuts the intake valve 144 such that physical movement of the intake valve 144 also moves the tire valve 55. Springs 146 connected to the linkage 149 and valve stem 147 close the valves 55, 144 when the manual force is removed.

Preferably, the system 50 includes an electricity storage device 54 embodied as a battery 54. Alternatively, the electricity storage device 54 may be a capacitor or other device which stores electricity. The electric pump 56 is a pneumatic pump that includes mechanical components which are similar to those described in relation to FIG. 1. In one embodiment, the turbine 18 drives a worm gear 58 which turns a shaft 60 of the electric generator 52. Of course, bevel gears may also be used to couple the turbine shaft 26 and the shaft 60.

Preferably, the electric generator 52 comprises a conventional electric generator II which operates on the principles of magnetic fields and induction. Accordingly, various configurations for the electric generator 52 may be used. Preferably, the electric generator 52 is sized to allow it to be connected to a vehicle rim within the sidewalls of a tire.

In one embodiment, an armature 62 is rotated within an magnetic field to produce direct current or alternating current (depending on the configuration) by induction. The armature 62 includes a wire wound around a conductor such as iron. The wire coil is connected to leads 64 to carry the electric current from the generator 52. Of course the configuration may be different in other induction generators 52.

Preferably, the leads 64 are coupled to the electricity storage device 54 (i.e. the battery 54) and the electric pump 56. In one configuration, the electric pump 56 and electric generator 52 are sized such that the electric generator 52 supplies enough electricity to directly power the electric pump 56. Alternatively, the electric current from the electric generator 52 may be stored in the battery 54 and the battery 54 may be the primary source of current for the electric pump 56.

Generally, the electric pump 56 is coupled to a pressure sensor 48. In the depicted embodiment, the pressure sensor 48 is integrated with the pump 56 and may be powered by the battery 54. The pressure sensor 48 serves as a switch to activate the electric pump 56 when the pressure level drops below a pre-determined level. If the pressure is at the pre-determined level and the electric generator 52 is producing electricity, the electricity may be stored in the battery 54 for use later.

Figure 4:
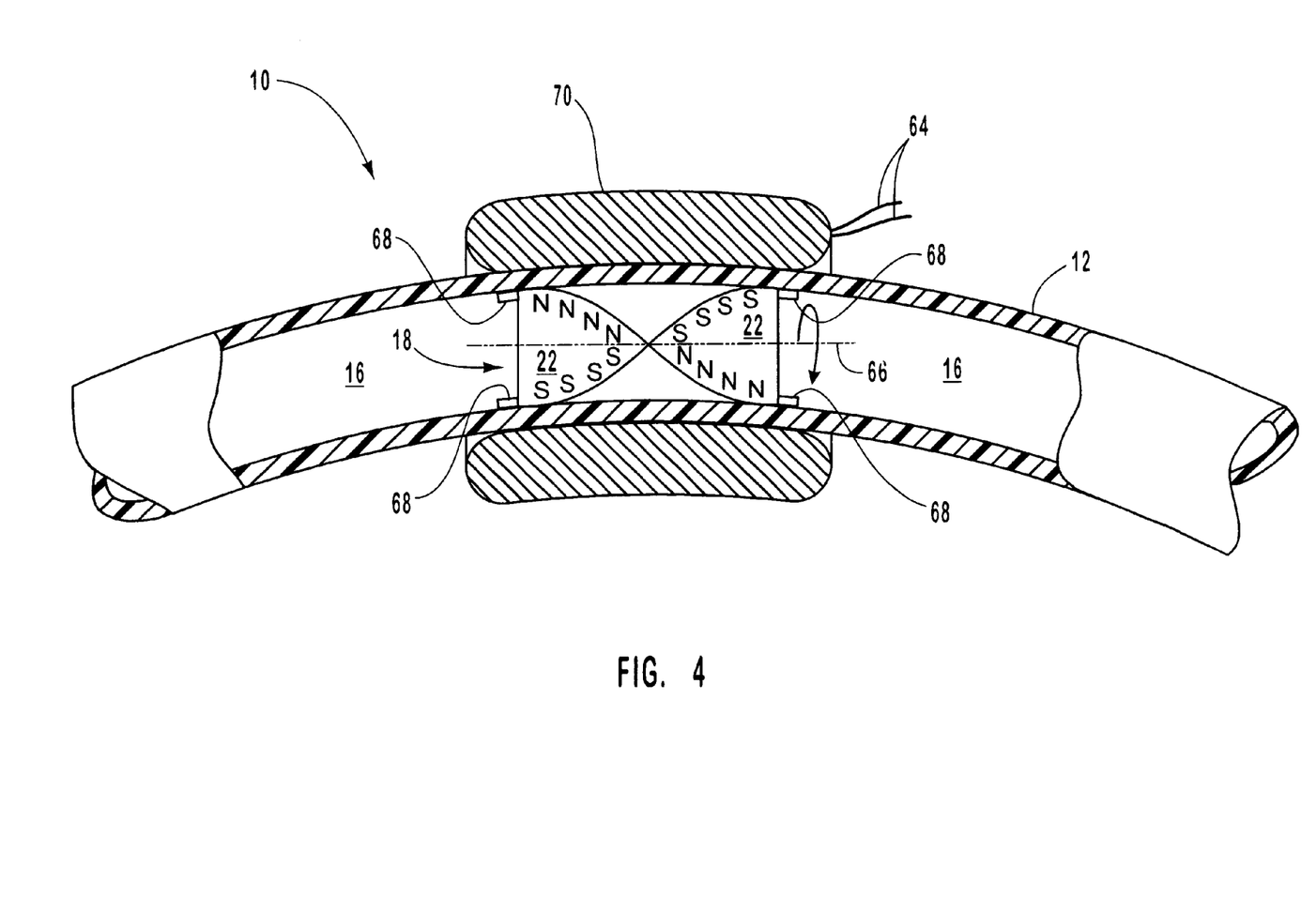
FIG. 4 is a perspective cut-away view of an alternative embodiment which combines the turbine and an electric generator to use the inertia of the fluid within the tube.

Referring now to FIG. 4, an alternative embodiment in which an electric generator 52 is integrated with the turbine 18 of the fluid fly-wheel 10 is illustrated. In this embodiment, the turbine 18 is a magnetic turbine. The turbine 18 is made from a material which may be naturally or artificially magnetized to produce a magnetic field. For example, the turbine 18 may be made from a combination of iron oxide and barium or strontium.

In one embodiment, the magnetic turbine 18 is preferably a rectangular shape having a single twist formed between the two shortest edges. In one configuration, the turbine 18 has a northern polarity along one longest edge and a southern polarity along the other longest edge. The twist forms two props 22 which then have reversed polarities to each other. The props 22 are configured to catch fluid 16 which flows laterally along a longitudinal axis 66 of the turbine 18.

Generally, the twisted magnetic turbine 18 has a width to maximize the amount of flowing fluid 16 that hits the props 22. The turbine 18 is of a length to allow the turbine 18 to rotate freely along the longitudinal axis 66 within the tube 12. Preferably, two or more stops 68 are secured within the tube 12 on either side of the turbine 18 to prevent lateral movement of the turbine 18 within the tube 12. In one configuration, the stops 68 may be axial bearings or the like to facilitate rotation of the turbine 18.

Preferably, a pair of opposing wire coils 70 are saddled over the tube 12 such that the wire is within a magnetic field generated by the magnetic turbine 18. Generally, the coils 70 include any number of windings of conductive material such as wire. The coils 70 are attached to the leads 64. As the fluid 16 turns the props 22 to rotate the turbine 18 about the longitudinal axis, the changing magnetic field creates a current in the wire coils 70 which is carried by the leads 64 to other components discussed above, including a battery 54 or electric pump 56.

Figure 5:
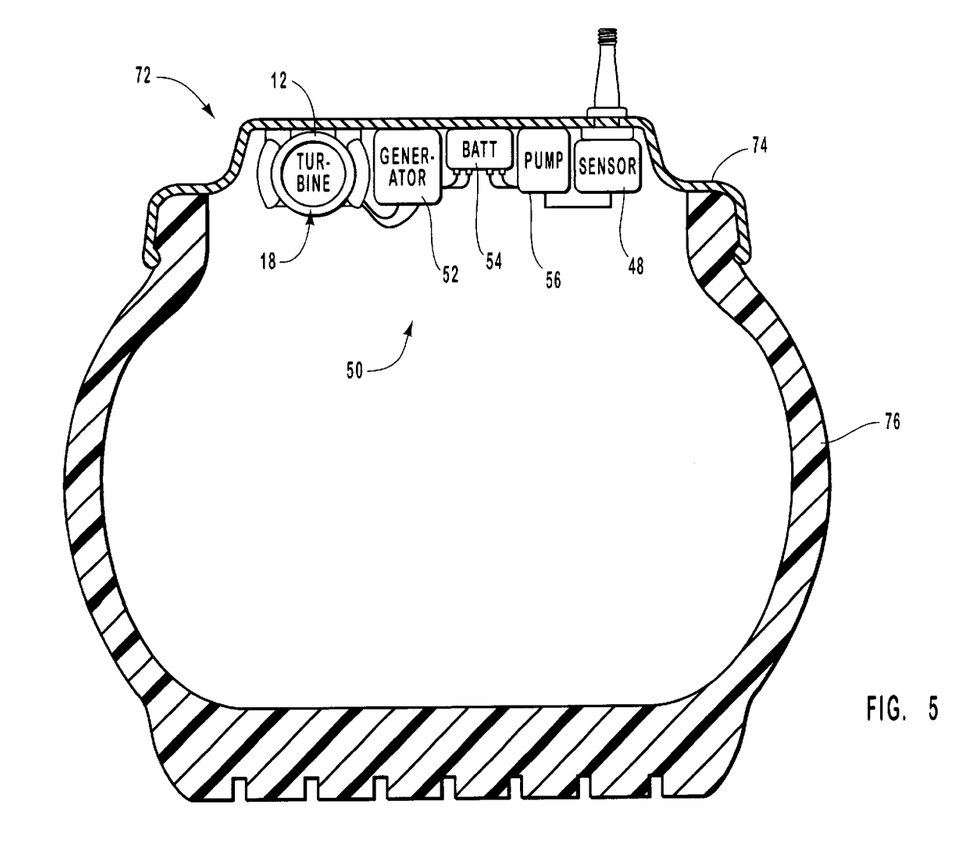
FIG. 5 is a perspective end view illustrating one location for a tire pressure maintenance and monitoring system components with respect to other parts of a vehicle wheel.

In FIG. 5, a fluid fly-wheel 10 is illustrated in cross-section along with other components of a tire pressure maintenance and monitoring system 50 according to one embodiment. FIG. 5 illustrates how a self-contained system 50 may be installed in a conventional vehicle wheel 72.

In one embodiment, all of the system's components are rigidly fixed to the rim 74. Preferably, the tube 12 encircles the rim 74 and the other components are fixed to the interior wall of the rim 74. In one configuration, such as the system 50 of FIG. 3, the leads 64 allow the different components to be evenly distributed around the rim's interior. An even distribution facilitates balancing of the wheel 72. As illustrated, the system 50 is enclosed within a tire 76 secured to the rim 74. Alternatively, certain system components may be attached to the rim 74 external to the tire 76.

Of course, due to limited space on the inside of the rim 74 the system components are generally very small in relation to the size of the wheel 72. While the components are relatively small, the system 50 continually supplies small amounts of air as the vehicle is accelerated and decelerated during normal use. In particular, the system 50 works well for vehicles doing significant city driving.

The system 50 supplies small amounts of pressurized air over a time period sufficient to compensate for lost air pressure due to a slow leak. The slow leaks are those which are most often not detected until a loss in fuel efficiency and tire life have already occurred. For example, the system 50 described may produce 1–2 cubic inches per day. This output is sufficient to make up a leak loss of 5 psi within 6 months.

With conventional tire pressure maintenance systems, one or more components may be connected to the tire 76, an axle of the wheel 72, or both. However, these systems generally interfered with the tire 76 behavior, and/or wheel axle. The systems may impede regular maintenance of the wheel 72 and/or access to other components such as brakes which require removal of the wheel 72. In addition, if the systems failed, for example, by coming disconnected, the system components often damage the tire 76 or release all pressurized air causing the wheel 72 to fail.

However, as illustrated in FIG. 5, the present invention is completely self-contained. Therefore, failure of the system 50 does not generally lead to an overall failure of the wheel 72. Furthermore, embodiments which include an electronic sensor 48 for controlling the pump 56 are generally more reliable than their mechanical counterparts.

The importance of proper tire inflation has prompted a U.S. government agency, the National Highway Traffic Safety Administration (NHTSA), to propose new regulations which would require monitoring of the air pressure. While indirect methods for determining whether a tire 76 has low air pressure may be used, direct measurement of the tire pressure and reporting of the reading for communication to a driver is recognized as superior. Conventional tire pressure monitoring systems are generally very expensive.

In contrast, certain embodiments of the present invention provide for inexpensive tire pressure monitoring as well as maintenance. The self contained aspect and simple design of the present invention provide monitoring and maintenance of tire pressure with minimal expense.

Figure 6:
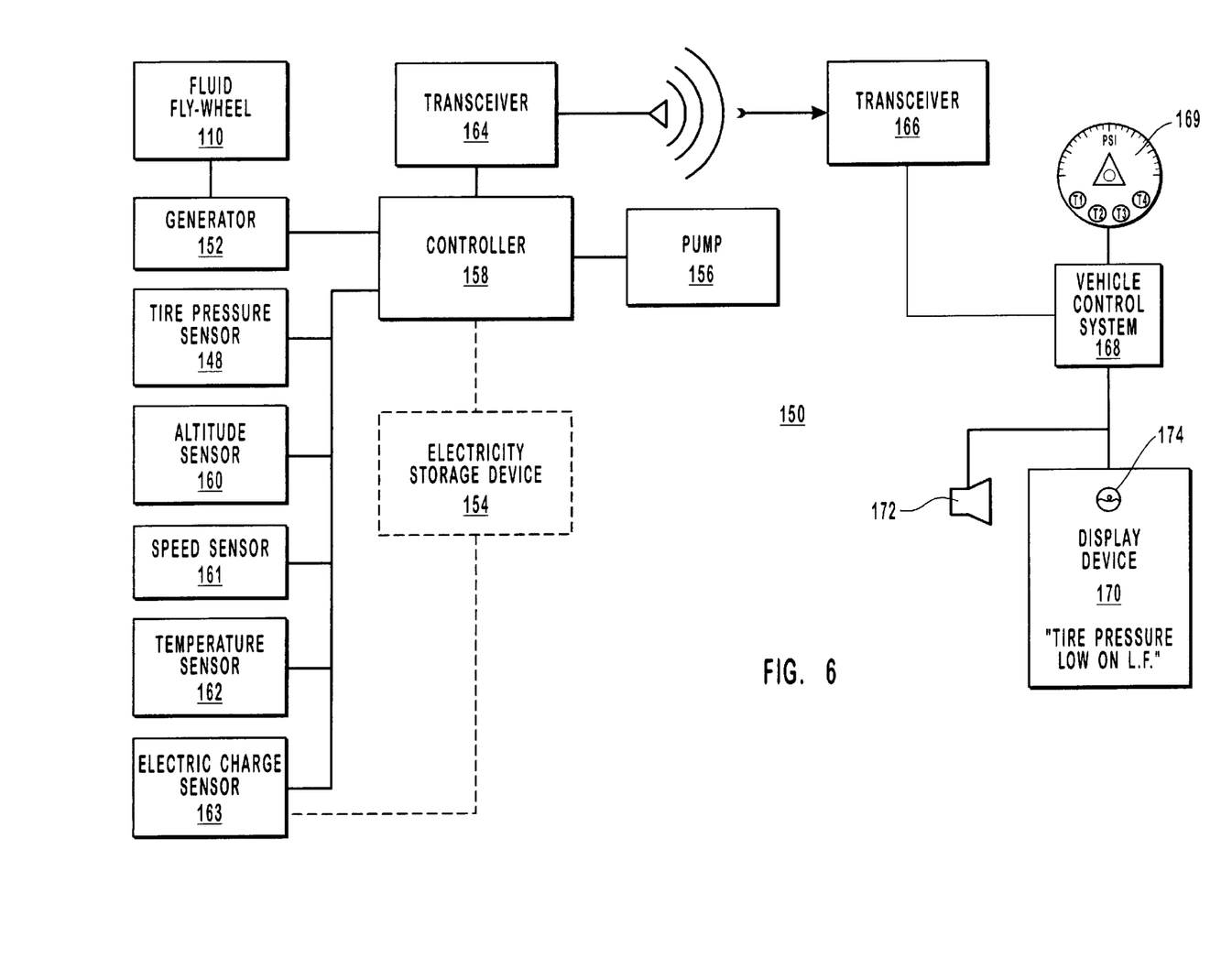
FIG. 6 is a schematic diagram illustrating various components of one embodiment of a tire pressure maintenance and monitoring system.

FIG. 6 illustrates a schematic diagram of one embodiment of a system 150 that includes components similar to those of the system 50 of FIG. 3. For example, the fluid fly-wheel 110, tire pressure sensor 148, electric generator 152, electricity storage device 154, and electric pump 156 may be implemented as described in relation to FIG. 3. Alternatively, various other implementations of the components may be used. Preferably, the electricity storage device 154 is a battery 154.

In addition, in one embodiment, the system 150 includes a tire pressure sensor 148, an altitude sensor 160, a speed sensor 161, a temperature sensor 162, and an electric charge sensor 163. These sensors 148, 160, 161, 162, 163 provide readings regarding, respectively, the current tire pressure, the altitude of the tire, the speed of the tire, the ambient temperature, and the amount of charge stored in the electricity storage device 154.

The readings may be used to compensate for the affects of temperature and altitude on tire pressure in regulating the pump 156. Furthermore, the readings may be used to determine when to activate the pump 156. For example, the pump 156 may only be activated when the wheel has a speed within a pre-determined speed range. The speed sensor 161 provides this speed reading.

The electric charge sensor 163 may be coupled to the controller 158 and the electricity storage device 154. Readings from the electric charge sensor 163 may be used to determine whether the electricity storage device 154 is at an operable level. If not, generated electricity may be diverted to the electricity storage device 154 while the pump 156 is inactive. If so, generated electricity may be discharged until needed. Thus, the level of charge in the electricity storage device 154 may be monitored and maintained to ensure proper operation of the system 150.

In one embodiment, the sensors 148, 160, 161, 162, 163 are also fixed to the rim 74 within the tire 76. Alternatively, the altitude sensor 160 and temperature sensor 162 may be located elsewhere on the vehicle. However, the sensors 148, 160, 161, 162, 163 are preferably in communication with a controller 158.

The controller 158 sends and receives control signals and other information between the various components of the system 150. Preferably, the controller 158 is coupled to the generator 152, the pump 156, the electricity storage device 154, and the sensors 148, 160, 161, 162, 163. The controller 158 may be implemented as a central processing unit (CPU), state machine, microprocessor, microcontroller, digital signal processor (DSP), or the like. Generally, the controller 158 receives readings from the sensors 148, 160, 161, 162, 163. The controller 158 uses the readings to control when the pump 156 is activated. The controller 158 may also determine whether to send electric current from the generator 152 to the electricity storage device 154 or the pump 156.

In one embodiment, the controller 158 is also coupled to a first transceiver 164. The first transceiver 164 sends and receives signals wirelessly to and from a second transceiver 166. In one configuration, the transceivers communicate via radio frequency (RF) waves. Alternatively, other wireless technologies such as infrared (IR), microwaves, induction, light, or other similar signal transduction technologies may be used. While communication is illustrated in one direction, the transceivers 164, 166 may also communicate bi-directionally.

Preferably, the first transceiver 164 is secured to a rim 74 while the second transceiver 166 is located within a vehicle. The transceivers 164, 166 enable the system 150 to pass information from the rotating wheel 72 to the non-rotating vehicle. The second transceiver 166 may be coupled to a vehicle control system 168 (VCS).

The VCS 168 may control various systems within a vehicle including the tire pressure in one or more wheels 72. In one embodiment, the VCS 168 may be coupled to a display device 170. The display device 170 may comprise a digital readout. In one embodiment, a numeric representation of the tire pressure in one or more wheels 72 may be displayed to a driver. Alternatively, or in addition, a speaker 172 may deliver an audible alert relating to low tire pressure in one or more wheels 72. Alternatively, the display device may simply include a notification light 174 which is illuminated to notify the driver that one or more wheels 72 has low tire pressure.

In one embodiment, the controller 158 uses the electric charge sensor 163 to maintain a level of charge in the electricity storage device 154 which is at least sufficient to transmit the current tire pressure reading to the second transceiver 166. In this manner, the system 150 may provide continuous monitoring of the tire pressure in the vehicle tires. So, on a trailer of a truck, if one tire of a dual tire set fails the driver is notified. The system 150 was not able to overcome the tire leak or failure but provides a notification which helps the driver to prevent causing further tire damage.

In another embodiment, the VCS 168 collects the readings from a controller 158 associated with each wheel. The VCS 168 may include an algorithm (not shown) such as a computer program which determines an optimal tire pressure level for each tire based on the readings and/or position of the tires. For example, in cold conditions the optimal tire pressure for the front tires may be 30 psi, while the optimal tire pressure is 25 psi. for the rear tires.

The calculated optimal tire pressure levels may be the pre-determined air pressure level used by a controller in each tire. The VCS 168 may communicate the calculated optimal air pressure levels to a controller 158 for each tire by way of the first and second transceivers 164, 166. The VCS 168 may calculate and communicate the optimal tire pressure levels to the controllers 158 automatically. As referenced herein the term "automatically" is defined as not requiring user instigation, intervention, or notification. Thus, an operation that is performed automatically may be performed transparent to the user.

Alternatively, a user, vehicle occupant may manually set the pre-determined air pressure level for each tire. The VCS 168 may be coupled to a selector 169. Preferably, the selector 169 is analog. Alternatively, the selector 169 may be digital. When a user adjusts the pre-determined air pressure level on the selector 169 for a specific wheel (T1, T2, T3, or T4), the new air pressure level is communicated to the VCS 168 which communicates the new pre-determined air pressure level to the controller 158 for the selected wheel. Thus, a driver may adjust the pre-determined air pressure levels for the wheels based on driving and environmental conditions, or on personal preferences.

Referring now indirectly to FIGS. 1–6, embodiments of a tire pressure maintenance and monitoring system 150 powered by a simple fluid fly-wheel generator 10, 110 are provided. The fluid fly-wheel 10, 110 which leverages the inertia of the fluid 16 and acceleration of the tube 12. In one embodiment, the tire pressure is simply maintained at a pre-determined level. In another embodiment, such as that described in FIG. 6, the system 150 maintains, monitors, and reports the status of tire pressure in one or more wheels of a vehicle. System components are small, inexpensive, reliable, and do not interfere with the axle or tire of a wheel 72. Furthermore, failure of the system 50, 150 generally does not cause failure of the tire 76 or wheel 72. The system 50, 150 provides small amounts of pressurized air to compensate for slow leaks, or other changes to tire pressure caused by changes in altitude or ambient temperature.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by Letters Patent is:

1. A generator, comprising:
    a sealed tube rotatable about an axis;
    a fluid disposed within the tube such that the fluid moves within the tube when the tube accelerates about the axis; and
    a turbine in communication with the fluid, the turbine being rotated by the moving fluid within the tube.

2. A generator as in claim 1, wherein when the tube and fluid rotate about the axis at a constant rotational velocity, a change in rotational velocity of the tube causes the fluid to continue moving within the tube and rotate the turbine.

3. A generator as in claim 1, further comprising:
    an electric generator connected to the turbine to produce an electric current through induction;
    an electricity storage device electrically coupled to the electric generator to store the electric current;
    an electric pump coupled to the electricity storage device and activated by a pressure sensor when air pressure within a pressurized chamber drops below a predetermined level, the pump increasing the air pressure within the pressurized chamber to the pre-determined level.

4. A generator as in claim 3, wherein the electricity storage device comprises a battery.

5. A generator as in claim 3, wherein the electricity storage device comprises a capacitor.

6. A generator as in claim 1, further comprising:
    a spur gear connected to the turbine; and
    a piston of a pneumatic pump, the piston being connected by a crank to a drive gear coupled to the spur gear; the piston being pumped when the spur gear is turned by the turbine.

7. A generator as in claim 6, wherein the piston comprises a temperature sensitive spring that biases the piston against compression; the bias force of the spring changing as the ambient temperature changes.

8. A generator as in claim 6, wherein the pump is configured to maintain a constant pressure within a pneumatic pressurized chamber.

9. A generator as in claim 1, wherein the tube is toroidal.

10. A generator, comprising:
    a sealed tube rotatable about an axis;
    a fluid disposed within the tube such that the fluid moves within the tube when the tube accelerates about the axis;
    a pair of opposing conductive coils in close proximity to the tube;
    a magnetic turbine within the tube between the conductive coils, the magnetic turbine having a longitudinal axis; and
    wherein the moving fluid within the tube rotates the magnetic turbine about the longitudinal axis to produce an electric current in the conductive coils.

11. A generator as in claim 10, further comprising:
    an electricity storage device to store the electric current, the storage device being electrically coupled to electric leads from the coils;
    an electric pneumatic pump coupled to the storage device and activated when air pressure within a pressurized chamber drops below a predetermined level, the pump increasing the air pressure within the pressurized chamber to the pre-determined level.

12. A generator as in claim 11, wherein the electricity storage device comprises a battery.

13. A generator as in claim 11, wherein the electricity storage device comprises a capacitor.

14. A generator as in claim 11, further comprising:
    an intake valve in fluid communication with an ambient air supply and the pump;
    an output valve in fluid communication with the pump and the pressurized chamber;

wherein rotating the tube about the axis with at least a pre-determined velocity opens the intake valve to allow the pump to pump ambient air through the output valve and into the pressurized chamber.

15. A generator as in claim 14, wherein the intake valve comprises a stem for manually opening the intake valve and the generator further comprises:
   a tire valve in fluid communication with the intake valve and the pump, the tire valve having a linkage;
   wherein moving the stem opens the intake valve and moves the linkage which opens the tire valve.

16. A generator as in claim 11, further comprising:
   a controller coupled to the pump;
   a pressure sensor in communication with the controller, the pressure sensor configured to monitor air pressure within the pressurized chamber;
   a temperature sensor and an altitude sensor in communication with the controller; and
   wherein the controller collects readings from the pressure sensor, temperature sensor, and altitude sensor and activates the pump based on the readings.

17. A generator as in claim 16, wherein the tube is toroidal.

18. A self-contained tire pressure maintenance system, comprising:
   a vehicle wheel comprising a tire and a rim;
   a sealed tube fixed to the rim;
   a fluid disposed within the tube such that the fluid moves within the tube when the rim rotationally accelerates;
   a turbine in communication with the fluid inside the tube, the turbine being turned by the moving fluid; and
   a pneumatic pump fixed to the rim and coupled to the turbine, the pump being configured to maintain constant air pressure within the tire when the turbine rotates.

19. A self-contained tire pressure maintenance system as in claim 18, further comprising:
   an intake valve in fluid communication with an ambient air supply and the pump;
   an output valve in fluid communication with the pump and the tire;
   wherein rotating the tube about the axis with at least a pre-determined velocity opens the intake valve to allow the pump to pump ambient air through the output valve and into the tire.

20. A self-contained tire pressure maintenance system as in claim 19, wherein the intake valve comprises a stem for manually opening the intake valve and the system further comprises:
   a tire valve in fluid communication with the intake valve and the pump, the tire valve having a linkage;
   wherein moving the stem opens the intake valve and moves the linkage which opens the tire valve.

21. A self-contained tire pressure maintenance system as in claim 18, wherein the pneumatic pump comprises:
   a piston coupled by one or more gears to the turbine, the piston being pumped when the one or more gears are turned by the turbine.

22. A self-contained tire pressure maintenance system as in claim 21, wherein the piston is biased by a temperature sensitive spring that biases the piston against compression, the bias force of the spring changing as the ambient temperature changes.

23. A self-contained tire pressure maintenance system as in claim 22, wherein when the tube and fluid rotate about an axle of the wheel at a constant rotational velocity a change in rotational velocity of the tube causes the fluid to continue moving within the tube and rotate the turbine.

24. A self-contained tire pressure maintenance system, comprising:
   a vehicle wheel comprising a tire and a rim;
   a sealed tube fixed to the rim;
   a fluid disposed within the tube such that the fluid moves within the tube when the rim rotationally accelerates;
   a turbine in communication with the fluid inside the tube, the turbine being turned by the moving fluid; and
   an electric generator connected to the turbine to produce an electric current through induction.

25. A self-contained tire pressure maintenance system as in claim 24, further comprising:
   a battery electrically coupled to the electric generator to store the electric current.

26. A self-contained tire pressure maintenance system as in claim 25, further comprising:
   an electric pneumatic pump electrically coupled to the battery and the electric generator, the pump being activated by a tire pressure sensor when air pressure within the tire drops below a pre-determined level.

27. A self-contained tire pressure maintenance system as in claim 26, wherein when the tube and fluid rotate about an axle of the wheel at a constant rotational velocity a change in rotational velocity of the tube causes the fluid to continue moving within the tube and rotate the turbine.

28. A self-contained tire pressure maintenance system as in claim 27, further comprising:
   an intake valve in fluid communication with an ambient air supply and the pump;
   an output valve in fluid communication with the pump and the tire;
   wherein rotating the tube about the axis with at least a pre-determined velocity opens the intake valve to allow the pump to pump ambient air through the output valve and into the tire.

29. A self-contained tire pressure maintenance system as in claim 28, wherein the intake valve comprises a stem for manually opening the intake valve and the system further comprises:
   a tire valve in fluid communication with the intake valve and the pump, the tire valve having a linkage;
   wherein moving the stem opens the intake valve and moves the linkage which opens the tire valve.

30. A self-contained tire pressure maintenance system as in claim 27, further comprising:
   a controller coupled to the electric generator, the battery, the pump and the tire pressure sensor; the tire pressure sensor monitoring air pressure within the tire;
   a temperature sensor and an altitude sensor in communication with the controller; and
   wherein the controller collects readings from the tire pressure sensor, temperature sensor, and altitude sensor and activates the pump based on the readings.

31. A self-contained tire pressure maintenance system as in claim 30, further comprising:
   a speed sensor coupled to the controller which allows the controller to activate the pump based on speed readings.

32. A self-contained tire pressure maintenance system as in claim 30, further comprising:

a first transceiver coupled to the controller;

a second transceiver coupled to a vehicle control system;

wherein the first transceiver and second transceiver communicate one or more signals; and wherein the vehicle control system presents signals representing the readings to a driver using a display device.

33. A self-contained tire pressure maintenance system as in claim 32, further comprising an electric charge sensor for monitoring an amount of charge in the battery, the electric charge sensor being coupled to the battery and the controller, the controller using the electric charge sensor to maintain a level of charge in the battery at least sufficient to transmit a tire pressure reading to the second transceiver.

34. A self-contained tire pressure maintenance system as in claim 32, wherein the vehicle control system automatically adjusts the pre-determined air pressure level for the tire based on the readings, the predetermined air pressure level being communicated to the controller by way of the first and second transceivers.

35. A self-contained tire pressure maintenance system as in claim 34, further comprising a selector coupled to the vehicle control system to allow a user to adjust the pre-determined air pressure level for the tire, the pre-determined air pressure level being communicated to the controller by way of the first and second transceivers.

36. A self-contained tire pressure maintenance system as in claim 32, wherein the first transceiver and second transceiver communicate via radio frequency (RF) signals.

37. A self-contained tire pressure maintenance system as in claim 32, wherein the display device displays numerical readings.

38. A self-contained tire pressure maintenance system as in claim 32, wherein the display device activates an audible alert.

39. A self-contained tire pressure maintenance system as in claim 32, wherein the display device illuminates a notification light.

40. A self-contained tire pressure maintenance system as in claim 32, wherein the tube is toroidal.

* * * * *